United States Patent Office 2,871,006
Patented Jan. 27, 1959

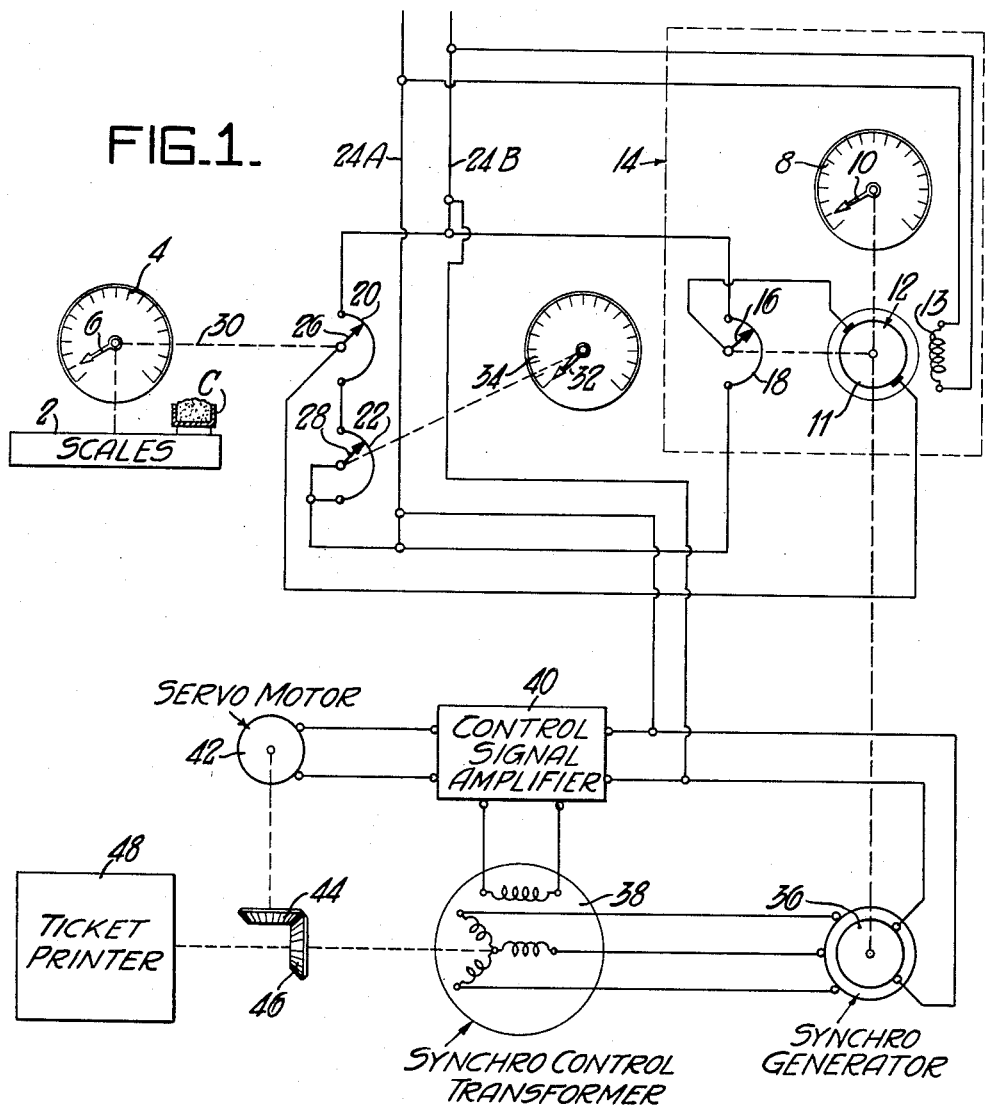

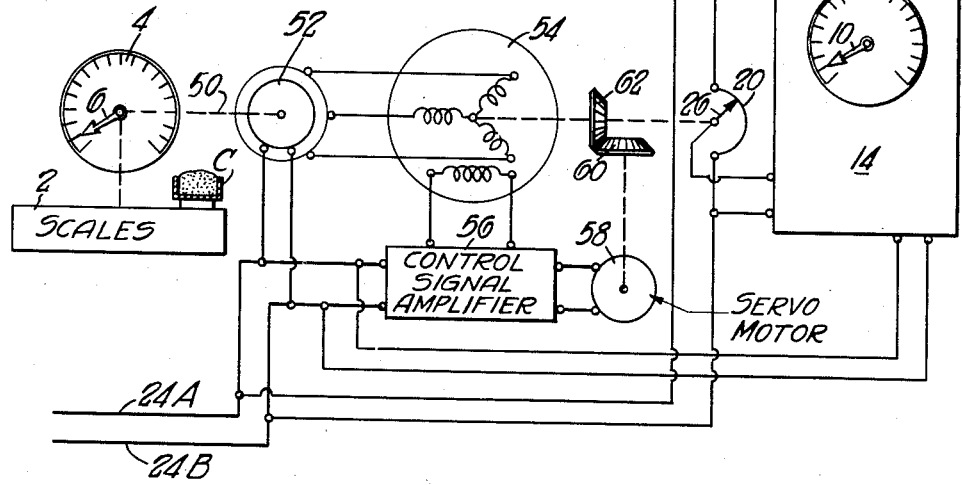
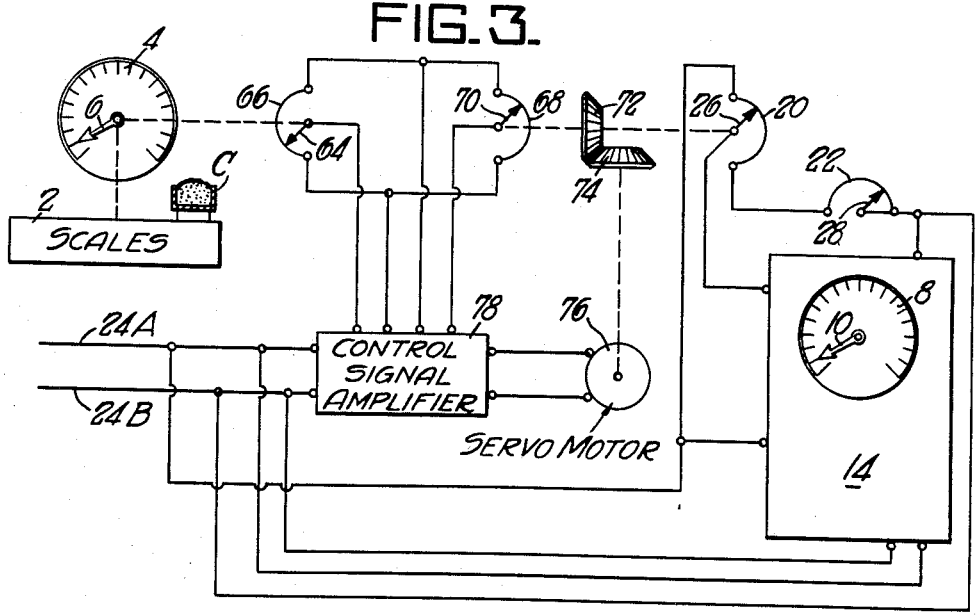

2,871,006
APPARATUS FOR DETERMINING THE NET WEIGHT OF MATERIAL IN A CONTAINER

Joseph W. Hags, Irwin, Pa., assignor to United States Steel Corporation, a corporation of New Jersey Application December 3, 1952, Serial No. 323,870

3 Claims. (Cl. 265—70)

This invention relates to apparatus for determining the net weight of material in a container such as iron ores, limestone and coke in a railroad or "Larry" car. In the weighing of material in a container it is generally desirable to known the net weight of the material and this is ordinarily done by subtracting the weight of the container from the gross weight shown on a scale. This takes time and the workman sometimes makes a mistake in his subtraction so that this method is not satisfactory. In some instances scales have been provided with apparatus which will permit the net weight to be directly indicated. Such apparatus is generally complicated and expensive or is not completely accurate.

It is an object of my invention to provide apparatus for determining the net weight of material in a container which apparatus is relatively simple in construction, inexpensive and accurate.

This and other objects will be more apparent after referring to the following specification and attached drawings, in which:

Figure 1 is a schematic view of one embodiment of my invention;

Figure 2 is a schematic view, similar to Figure 1, showing a second embodiment of my invention; and Figure 3 is a schematic view, similar to Figure 2, showing a third embodiment of my invention.

Referring more particularly to Figure 1 of the drawings, the reference numeral 2 indicates a scale for weighing material. The type of scale and the operation thereof are immaterial insofar as the present invention is concerned. The scale 2 is provided with a dial 4 having an indicating arm or pointer 6 which moves to indicate the total weight of the material on the scale. This indicated weight will be the weight of the container C plus the material in the container. The net weight of the material in the container C is indicated on a dial 8 which has an indicating arm or pointer 10 associated therewith in the following manner. The arm 10 is moved by means of a reversible motor 12 of a self-balancing potentiometer shown schematically at 14. The motor 12 also moves the contact arm 16 of the variable resistor or potentiometer 18 of the self-balancing potentiometer 14. The connections between the contact arm 16 and the pointer 10 to the armature 11 of motor 12 may be direct or through gear trains to gain precision. Potentiometers 20 and 22 are connected in series and power is supplied to the circuit by means of the wires 24A and 24B. Potentiometers 18 and 20 are preferably identical and potentiometer 22 preferably has a tapered resistance value. The contact arm 16 is electrically connected to one side of the armature 11 and the contact arm 26 is electrically connected to the other side of the armature 11. When the contact arm 28 of potentiometer 22 is in the zero resistance position, the currents flowing through the potentiometers 18 and 20 are identical. Since the currents are identical, the voltage drops from wire 24A to similar positions on potentiometers 18 and 20 are the same. Therefore, the voltage between contact arms 16 and 26 is zero when they are in the same relative positions on their respective potentiometers. The field or stator 13 of motor 12 is connected to the power supply wires 24A and 24B, thus maintaining the field in constant relationship with wires 24A and 24B. The direction and torque of the motor armature 11 is a function of the relative positions of potentiometer contact arms 16 and 26 on potentiometers 18 and 20. Means are provided for causing contact arm 26 to move proportionally to the movement of indicating arm 6. As shown in Figure 1, this is a mechanical connection 30. The contact arm 28 of potentiometer 22 is connected to a pointer 32 of an indicating dial 34, either directly or through a gear train to indicate tare weight.

The operation of the device is as follows: The arm 32 is moved to indicate the weight of the container to be weighed. This movement causes the contact arm 28 to move correspondingly and, through the electrical controls, causes the net weight indicating arm 10 to tend to move in the minus direction an amount representing the weight of the container. The container C and the material therein are placed on the scale and the indicator arm 6 will move to indicate the gross weight on dial 4. This movement of the arm 6 causes corresponding movement of the arm 26 thus varying the voltage applied to the motor 12.

Since the contact arm 26 is no longer at its minimum position, there is a certain portion of the resistance between the contact arm 26 and wire 24A. The current flowing through this resistance causes a voltage drop in proportion to the distance which the contact arm 26 has moved. Since contact arm 16 is still in its zero position and thus in direct contact with wire 24A there is a voltage difference between the arms 16 and 26. This potential is applied to the armature 11 of the motor 12, thus causing the motor to rotate in a predetermined direction. Since pointer 10 of dial 8 and the contact arm 16 of potentiometer 18 are connected to the shaft of the armature of motor 12 they will rotate in the same manner as the motor. As the armature of motor 12 continues to rotate the contact arm 16 of potentiometer 18 moves away from wire 24A, and the resistance between wire 24A and the contact arm 16 increases. Since there is current flowing through the resistance, the voltage drop becomes greater until a point is reached where the voltage drop between the contact arm 16 of potentiometer 18 and wire 24A is almost equal to the voltage drop between the contact arm 26 of potentiometer 20 and wire 24A. The voltage difference between the two contact arms 16 and 26 gradually decreases and consequently the voltage applied to the rotor 11 of motor 12 reduces until it becomes so low that the motor will stop. Theoretically, the motor 12 will continue to rotate until it has moved the contact arm 16 to a position identical to that of the contact arm 26 of potentiometer 20, at which time the voltage difference between the two becomes zero. However, the load on the motor and internal friction causes the motor to stop before the position is reached where the two contact arms are in identical relative positions. There is still some voltage differential between the two, but not enough to cause rotation to continue. Therefore, there will be a very slight and insignificant error between the relative positions of the contact arms 16 and 26 and also between the pointers 6 and 8 of their respective dials. This error can be reduced to a minimum by amplifying the voltage difference between the contact arms 16 and 26 and feeding the amplified voltage to the armature 11 of motor 12. Since the pointer 10 of the net weight indicating dial 8 is connected to the armature 11 of motor 12 its position will represent the difference between the weight indicated by the pointer 6 of the gross weight indicating dial 4 and the weight indicated by the tare weight pointer 32. When there is no tare weight adjustment, the arm 28 is set in its zero position and there is none of the resistance of potentiometer 22 in the circuit. As the tare weight adjustment is moved toward the maximum position, its resistance in the circuit is increased. Therefore, whatever resistance is inserted in the circuit reduces the current in the circuit and thus reduces the voltage drop for a similar position of the contact arm 26. Consequently, the contact arm 16 of potentiometer 18 will assume a position where the voltage drop is equal to the voltage of contact arm 26 of potentiometer 20 at a proportionately lower position.

For example, if the tare weight adjustment is set at 10 percent of full scale capacity and a load of 50 percent of full scale capacity is placed on the scale, the normal weighing procedure of the scale will cause the pointer 6 to progress to 50 percent of full scale capacity. The linkage 30 connecting pointer 6 to contact arm 26 would cause the contact arm 26 of potentiometer 20 to advance to the corresponding position (50 percent) of the potentiometer. However, this would represent only 40 percent of the total potential across wires 24A and 24B because of the voltage drop across 10 percent of the tare weight adjusting potentiometer 23 which is in the circuit. This voltage will cause the rotor 11 of motor 12 to rotate and thus cause the contact arm 16 of potentiometer 18 to advance to the 40 percent position where the voltage would be the same as the 40 percent position of potentiometer 20. The voltages being equal at this point, the motor will stop. The net weight pointer 10 being connected to the contact arm 16 and rotor 11 will read 40 percent of full scale or the difference between the gross weight as indicated by the pointer 6 of gross weight dial 4 and the tare weight as indicated by the pointer 32 of the tare weight adjustment dial 34.

In some instances it is desirable to obtain a printed record of the net weight of the material being weighed. This is preferably done by connecting the arm 10 to rotate the rotor of a synchro generator 36 which is electrically connected to and supplies a voltage to a synchro control transformer 38. The synchro control transformer 38 transmits a voltage signal to a control signal amplifier 40 which amplifies the signal and converts it into power to cause a servo-motor 42 to rotate which in turn through bevel gears 44 and 46 causes the rotor of synchro control transformer 38 to rotate to a position corresponding to the position of the rotor of synchro generator 36. A ticket printer 48 is mechanically connected to the gear 46 and will print the net weight indicated on scale 8 when the gear 46 has moved the rotor of synchro control transformer to the position corresponding to the position of the rotor of synchro generator 36. Power for the synchro generator 36 and amplifier 40 is supplied from lines 24A and 24B.

While the arm 26 is shown mechanically connected to the arm 6, other means may be provided for moving the arm 26 in proportion to the movement of the arm 6, as shown in Figures 2 and 3. In Figure 2 there is a mechanical connection 50 between the arm 6 and the rotor of a synchro generator 52 which is electrically connected to a synchro control transformer 54. A control signal amplifier 56 is also connected to the synchro control transformer 54 and power is supplied to the synchro generator 52 and control signal amplifier 56 from the power lines 24A and 24B. The amplifier 56 is connected to the servomotor 58 which in turn is connected to rotate a bevel gear 60. Bevel gear 60 meshes with a gear 62 which is mechanically connected to synchro transformer 54. The gear 62 is mechanically connected to move the arm 26 in proportion to movement of the arm 6.

In Figure 3 the arm 6 is mechanically connected to the arm 64 of a potentiometer 66. A matching potentiometer 68 is connected in parallel with the potentiometer 66 and its arm 70 is connected to be moved by a bevel gear 72 which is in mesh with a similar bevel gear 74. Movement of the bevel gear 74 is controlled by means of servo motor 76 which is connected to a control signal amplifier 78. Power for the control signal amplifier 78 is provided from power lines 24A and 24B. The amplifier 78 is electrically connected to the potentiometers 66 and 68. The bevel gear 72 is connected to move the arm 26 in proportion to the movement of the arm 6. The remaining part of the circuit is identical with that of Figure 1, but the parts of the self-balancing potentiometer are not shown.

While several embodiments of my invention have been shown and described it will be apparent that other adaptations and modifications may be made without departing from the scope of the following claims.

I claim:

1. Apparatus for determining the net weight of material in a container comprising a scale for determining the weight of the material plus the weight of the container, an indicator for said scale, a power source having two leads, a variable resistor having a first end electrically connected to the first of said leads and a second end electrically connected to the second of said leads, a reversible motor mechanically connected to move the contact arm of said variable resistor, means electrically connecting the first side of said motor to the said contact arm, two potentiometers connected in series to said power source, the contact arm of the first of said two potentiometers being electrically connected to the second side of said motor, means for causing the contact arm of the first of said two potentiometers to move proportionately to the movement of said indicator, the contact arm of the second of said two potentiometers being movable in proportion to the weight of said container, and a net weight indicator connected to said motor for indicating the net weight of said material.

2. Apparatus for determining the net weight of material in a container according to claim 1 in which the means for causing the contact arm of the first of said pair of potentiometers to move proportionally to the movement of said indicator includes a mechanical connection between the first named contact arm and the said indicator.

3. Apparatus for determining the net weight of material in a container comprising a scale for determining the weight of the material plus the weight of the container, an indicator for said scale, a power source having two leads, a variable resistor having a first end electrically connected to the first of said leads and a second end electrically connected to the second of said leads, a reversible motor mechanically connected to move the contact arm of said variable resistor, means electrically connecting the first side of said motor to the said contact arm, two potentiometers connected in series to said power source, the contact arm of the first of said two potentiometers being electrically connected to the second side of said motor, means for causing the contact arm of the first of said two potentiometers to move proportionally to the movement of said indicator, the contact arm of the second of said two potentiometers being movable in proportion to the weight of said container, a net weight dial, an indicating arm for said dial, and means connecting said motor to said indicating arm for indicating the net weight of said material.

References Cited in the file of this patent

UNITED STATES PATENTS

| | | |
|---|---|---|
| 1,623,820 | West | Apr. 5, 1927 |
| 2,276,816 | Bagno | Mar. 17, 1942 |
| 2,407,513 | Pounds | Sept. 10, 1946 |
| 2,584,897 | Marco | Feb. 5, 1952 |
| 2,598,812 | Marco | June 3, 1952 |
| 2,602,660 | Shannon | July 8, 1952 |
| 2,610,052 | Macgeorge | Sept. 9, 1952 |
| 2,618,209 | Silent | Nov. 18, 1952 |
| 2,631,027 | Payne | Mar. 10, 1953 |
| 2,693,558 | Bastian | Nov. 2, 1954 |
| 2,695,981 | Smoot | Nov. 30, 1954 |
| 2,766,981 | Lauler | Oct. 16, 1956 |